United States Patent [19]

Nagashima

[11] Patent Number: 5,236,314
[45] Date of Patent: Aug. 17, 1993

[54] OIL PUMP DEVICE FOR A CHAIN SAW

[75] Inventor: Akira Nagashima, Kawasaki, Japan

[73] Assignee: Kioritz Corporation, Tokyo, Japan

[21] Appl. No.: 902,802

[22] Filed: Jun. 24, 1992

Related U.S. Application Data

[63] Continuation of Ser. No. 650,850, Feb. 5, 1991, abandoned.

[30] Foreign Application Priority Data

Feb. 6, 1990 [JP] Japan .................... 2-010895[U]

[51] Int. Cl.⁵ .................................. F04B 7/06
[52] U.S. Cl. ........................ 417/500; 417/492; 184/33
[58] Field of Search .............. 417/492, 500; 184/33; 30/123.4

[56] References Cited

U.S. PATENT DOCUMENTS

| | | | |
|---|---|---|---|
| 3,120,811 | 2/1964 | Jemison et al. | 417/500 |
| 3,448,829 | 6/1969 | Rauh et al. | |
| 3,632,236 | 12/1969 | Grantham | |
| 3,938,622 | 2/1976 | Densow | 184/32 |
| 4,465,440 | 8/1984 | Thomsen et al. | 417/500 |
| 4,764,093 | 8/1988 | Nagashima | 417/500 |
| 4,797,073 | 1/1989 | Kubota | 417/500 |
| 4,801,253 | 1/1989 | Johansson | 184/33 |
| 4,850,824 | 7/1989 | Naslund | 417/500 |
| 5,032,067 | 7/1991 | Progl | 184/33 |

FOREIGN PATENT DOCUMENTS 3637360 5/1987 Fed. Rep. of Germany .
947782 6/1947 France .

Primary Examiner—Richard A. Bertsch
Assistant Examiner—Michael I. Kocharov
Attorney, Agent, or Firm—Browdy and Neimark

[57] ABSTRACT

An oil pump device for a chain saw comprises a drive unit having a drive shaft and a gear fixed to the drive shaft and meshing with a worm gear fixed to a power output shaft of an engine. The oil pump device also comprises a pump unit having a pump casing and a plunger rotatably and axially reciprocatably received in the pump casing and drivingly connected to the drive shaft. The drive unit and the pump unit being formed as separate components and are drivingly connected to each other through a slide joint which permits the plunger to axially displace relative to the drive shaft.

4 Claims, 1 Drawing Sheet

OIL PUMP DEVICE FOR A CHAIN SAW

This application is a continuation of application Ser. No. 07/650,850, filed Feb. 5, 1991, now abandoned.

BACKGROUND OF THE INVENTION

The present invention relates to an improvement in the lubricating oil pump for a chain saw.

In general, a chain saw has a lubricating oil pump for supplying a lubricating oil to a saw chain which slidingly runs of the peripheral edge of a guide bar so as to cut trees and so forth. Conventional lubricating oil pumps have a pump portion and a driving portion which drives the pump portion. These portions are integrally assembled together so that it is impossible to demount the pump portion alone. Consequently, a laborious work is required for maintenance and repair of the pump portion. Furthermore, since the conventional lubricating oil pump is large in size, it is difficult to install the lubricating oil pump in a limited space of the chain saw below the longitudinal center line of the guide bar. Hitherto, therefore, the lubricating oil pump is disposed at an upper portion of the chain saw remote from a lubricating oil tank, impairing the pump performance due to increase in the required suction head.

SUMMARY OF THE INVENTION

Accordingly, an object of the present invention is to provide a lubricating oil pump for a chain saw having a simple construction and easy to mount, thereby overcoming the above-described problems of the prior art.

According to the present invention, there is provided an oil pump device for a chain saw comprising: a drive unit having a drive shaft and a gear fixed to the drive shaft and meshing with a worm gear fixed to a power output shaft of an engine; a pump unit having a pump casing and a plunger rotatably and axially reciprocatably received in the pump casing and drivingly connected to the drive shaft, the drive unit and the pump unit being formed as separate components; and a slide joint through which the pump unit is drivingly connected to the drive shaft.

In the oil pump device of the invention, the pump unit can be installed at any desired position on the chain saw and can easily be disconnected from the driving unit. This enables demounting of the pump unit alone for maintenance and repair. The pump unit is small in size and, hence, has a large degree of freedom of selection of the mounting position. It is therefore possible to mount the lubricating oil pump device by making an efficient use of a limited space available in the chain saw, while enabling the pump to exert its full performance through reduction in the suction resistance and head.

BRIEF DESCRIPTION OF THE DRAWING

The attached sole FIGURE is a schematic longitudinal sectional view of an embodiment of a lubricating oil pump for a chain saw in accordance with the present invention.

DESCRIPTION OF THE PREFERRED EMBODIMENT

Figure 1:
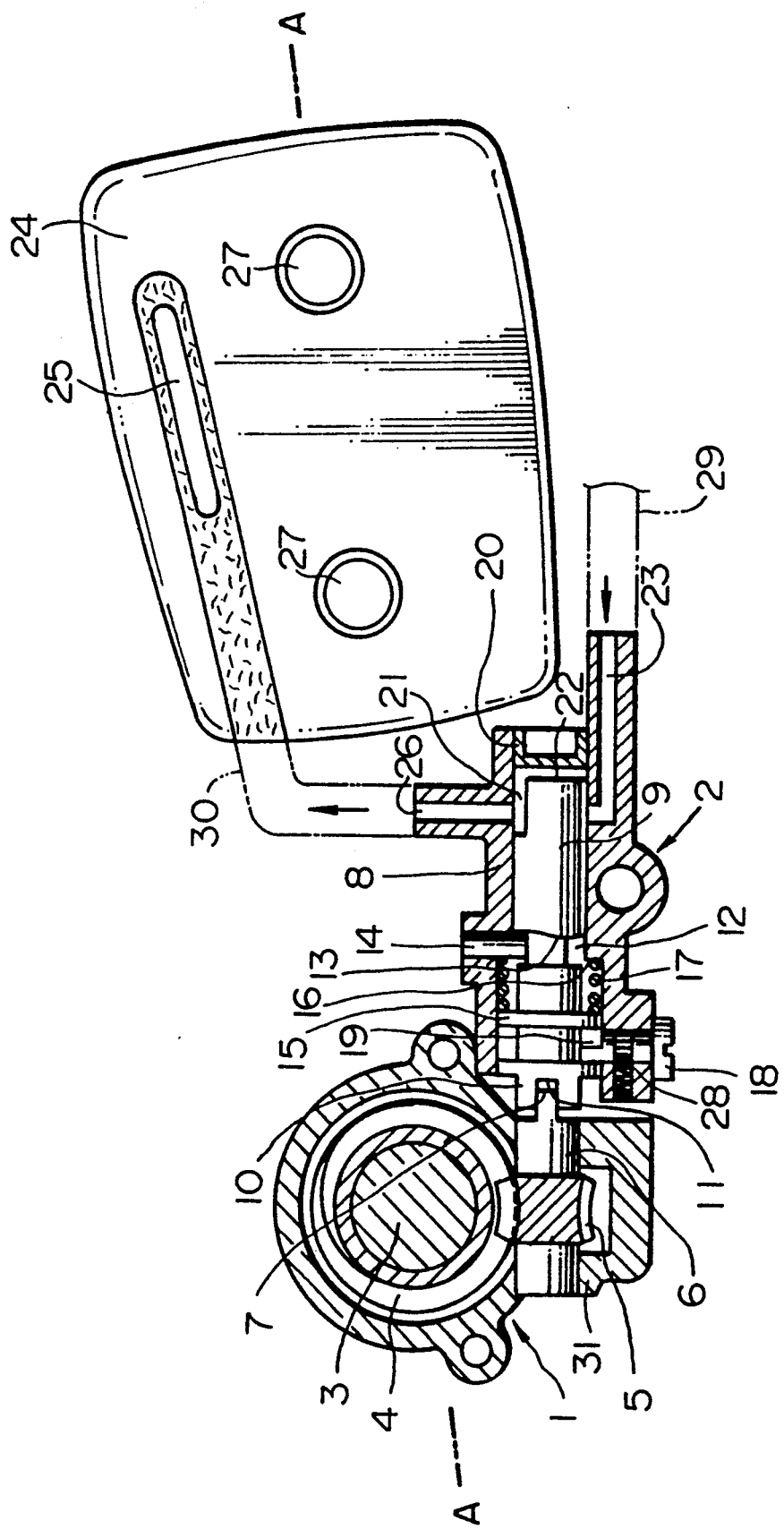

A preferred embodiment of the present invention will be described with reference to the accompanying drawing.

The illustrated lubricating oil pump device is composed mainly of a drive unit 1 and a pump unit 2 which are constructed as separate components. The drive unit 1 has a housing 31 and a drive shaft 6 rotatably supported by the housing 31. A gear 5 fixed to the drive shaft 6 meshes with a lower portion of a worm gear 4 which is fixed to one end of a crank shaft 3 as an output shaft of an engine (not shown) such as an air-cooled 2-stroke cycle engine, so as to be driven by the engine at a reduced speed. An axial projection 7 having a non-circular cross-section, e.g., a rectangular cross-section, projects from one end of the drive shaft 6 adjacent the pump unit 2 beyond the housing 31.

On the other hand, the pump unit 2 has a pump casing 8 and a pumping plunger 9 which is rotatably and axially reciprocatably disposed in the pump casing 8. An axial recess 11 complementary to the axial projection 7 on the drive shaft 6 is formed in the end surface of the plunger 9 adjacent the drive unit 1. Thus, the recess 11 in this case has, for example, a rectangular cross-section. The axial projection 7 and the recess 11 are coaxially and slidably engage with each other so as to form a slide joint which separably connect the drive unit 1 and the pump unit 2, while transmitting a driving torque from the drive shaft 6 of the drive unit 1 to the plunger 9 of the pump unit 2 thereby rotating the plunger 9, and which allows the plunger 9 to move axially relative to the drive shaft 6 which is not movable in the axial direction. The axial projection 7 and the recess 11 thus constitute mating configurations of the slide joint.

The plunger 9 has a cam groove 12 formed in the outer peripheral surface thereof. An axially oriented cam surface 13 is formed on the axial end surface of the cam groove 12 opposite to the aforementioned axial end 10. A needle 14 fixed to the pump casing 8 is disposed in the cam groove 12 so as to contact with the cam surface 13, so as to cause the plunger 9 to axially reciprocate during rotation of the plunger 9. The axial width of the cam groove 12 is determined to be large enough to allow full stroking of the plunger 9 caused by the cooperation between the cam surface 13 and the needle 14. The plunger 9 also has a flange portion 15 which protrudes from the outer peripheral surface of the plunger 9 at a position between the axial end 10 and the cam groove 12. A compression coiled spring is loaded between the flange portion 15 and a step 16 formed in the pump casing 8 so as to axially urge the plunger 9 towards the axial end 10 thereby keeping the cam surface 13 in contact with the needle 14, while functioning as a reset spring for resetting the plunger 9. A metering screw 18 is screwed to the pump casing 8 so as to extend inward. The metering screw 18 has an eccentric inner end 19 which is positioned so as to contact with the opposite side of the flange portion 15 of the plunger 9 to the coiled spring 17 during return stroking of the plunger 9 caused by the coiled spring 17. It is therefore possible to adjust the length of return stroke of the plunger 9 by rotating the metering screw 18. Preferably, the metering screw 18 is provided with a suitable click stop means 28.

The pump casing 8 defines a pump chamber 21 at its end 20 opposite to the axial end 10 of the plunger 9. The pump chamber 21 receives the other end 22 of the plunger 9 axially slidably and rotatably. The pump chamber 21 communicates with a suction passage 23 which is formed in the pump casing 8 and connected to a suction line 29 leading from an oil tank (not shown) and also with a discharge passage 26 through which a lubricating oil pressurized in the pump chamber 21 is supplied to the oil discharge port 25 provided in an upper part of a guide bar mounting portion 24 of the chain saw through a discharge line 30.

In operation, the drive shaft 6 of the drive unit 1 is driven by the power of the engine so that the plunger 9 of the pump unit 2 is rotated together with the drive shaft 6 through the slide joint composed of the axial projection 7 and the mating recess 11. As a consequence, the plunger 9 performs a reciprocatory motion over a stroke which is determined by the cooperation between the cam surface 13 and the needle 14 and which is adjustable by the metering screw 18, so that the lubricating oil is sucked into the pump chamber 21 through the suction passage 23 and the lubricating oil pressurized in the pump chamber 21 is sent to the oil discharge port 25 through the discharge passage 26. The pump unit 2 having the described construction can have a considerably small size so that it may be mounted even in a restricted space under the longitudinal center line A—A of the guide bar. It is thus possible to arrange the lubricating oil pump at a position where it can suck the lubricating oil with a small suction head.

Numerals 27 denote stud bolts which are provided on the guide bar mounting portion 24 for mounting the guide bar.

What is claimed is:

1. An oil pump device for a chain saw, comprising: a drive unit having a housing in which is housed a drive shaft and a gear fixed to said drive shaft and meshing with a worm gear fixed to a power output shaft of an engine of said chain saw; a pump unit having a pump casing and plunger rotatably, axially and reciprocatably received into said pump casing and drivingly connected to said drive shaft, said drive unit and said pump unit being formed as separated components and a slide joint formed by mating together outer ends of both said drive shaft and said plunger arranged outside of both said housing and said pump casing through which said pump unit is drivingly connected to said drive shaft to facilitate easy demounting of said pump unit from said drive unit.

2. An oil pump device in accordance with claim 1, wherein said slide joint comprises a pair of axially mating configurations, a first of said pair of mating configurations projecting outside said housing rom said drive shaft and a second of said pair of mating configurations projecting outside said pump casing from said plunger.

3. An oil pump device in accordance with claim 2, wherein said power output shaft is disposed perpendicular to the axis of said plunger.

4. An oil pump device in accordance with claim 1, wherein said power output shaft is disposed perpendicular to the axis of said plunger.

* * * * *